(12) United States Patent
Thoshkahna et al.

(10) Patent No.: US 12,537,010 B1
(45) Date of Patent: Jan. 27, 2026

(54) TECHNIQUES FOR OPTIMIZING STORAGE AND SPEED OF AUDIO FINGERPRINTING AND MATCHING SYSTEMS

(71) Applicant: Amazon Technologies, Inc., Seattle, WA (US)

(72) Inventors: Balaji Nagendran Thoshkahna, Bangalore (IN); Ivan Nelson Hall, III, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 219 days.

(21) Appl. No.: 18/339,181

(22) Filed: Jun. 21, 2023

(51) Int. Cl.
  *G10L 19/018* (2013.01)
  *G10L 25/54* (2013.01)

(52) U.S. Cl.
  CPC ............ *G10L 19/018* (2013.01); *G10L 25/54* (2013.01)

(58) Field of Classification Search
  None
  See application file for complete search history.

(56) References Cited

U.S. PATENT DOCUMENTS

| | | | |
|---|---|---|---|
| 9,093,120 B2 | 7/2015 | Bilobrov | |
| 9,208,790 B2 | 12/2015 | Bilobrov | |
| 9,589,283 B2 | 3/2017 | Kim | |
| 9,832,523 B2 | 11/2017 | Bilobrov | |
| 10,091,353 B1 * | 10/2018 | Sinclair | H04M 3/42221 |
| 2020/0081876 A1 * | 3/2020 | Wilkinson | G06F 16/2255 |

OTHER PUBLICATIONS

Avery Li-CHunWang et al, "An Industrial-Strength Audio Search Algorithm", pp. 1-7.

* cited by examiner

*Primary Examiner* — Hemant S Patel
(74) *Attorney, Agent, or Firm* — Robert C. Kowert; Kowert, Hood, Munyon, Rankin & Goetzel, P.C.

(57) ABSTRACT

Techniques are disclosed to optimize resource usage and matching speed of audio track fingerprinting and matching systems without causing excessive impacts on match accuracy. Fingerprints of corpus of audio tracks are recorded via a fingerprint table for use to match query tracks with known tracks in the corpus. However, very large buckets in the fingerprint table create strain on system resources and typically add little to no discriminative power to improve track matching accuracy. Thus, in embodiments, the disclosed system tracks the entry count of individual buckets, and drops bucket data of a bucket when the bucket reaches a count threshold. In embodiments, the disclosed system performs another technique during the matching process to exclude the highest-count fingerprint buckets from the matching process. These techniques may be adjusted according to user configuration or empirical data to maintain a high match accuracy level despite using fewer fingerprints.

20 Claims, 8 Drawing Sheets

TECHNIQUES FOR OPTIMIZING STORAGE AND SPEED OF AUDIO FINGERPRINTING AND MATCHING SYSTEMS

BACKGROUND

Audio fingerprint extraction and matching are important building blocks in high-accuracy algorithms for copyright infringement detection, original content verification, and content recognition. A set of fingerprints are extracted from an audio track based on landmarks detected in the spectrogram of the track's audio signal. These fingerprints are then recorded in a data structure that can be queried to identify known audio track(s) that contains a given audio clip. Large music databases may store billions of fingerprint records, which require vast amounts of storage space. However, some of the fingerprints are extremely common across the corpus of audio tracks, and do not contribute discriminative power to the matching process. These fingerprints can account for a large proportion of the storage space used by the fingerprint database, and can cause memory issues in servers that perform the fingerprinting and matching step. Better techniques are needed to optimize resource usage in these systems without causing unacceptable degradation in match accuracy.

Figure 1:
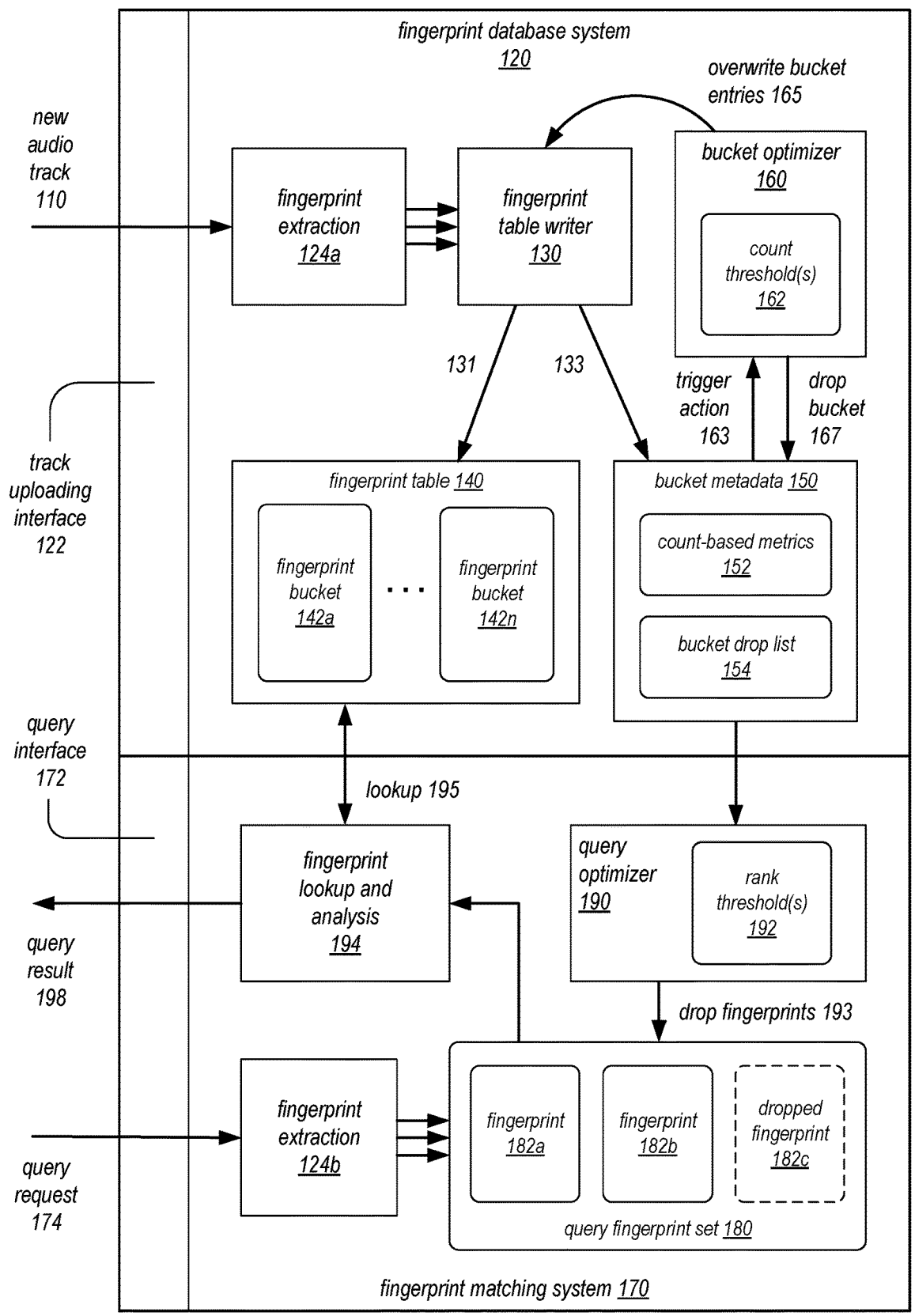
FIG. 1 illustrates an audio track management system that performs optimization operations to improve resource usage and system performance during audio track fingerprinting and matching, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Audio fingerprinting systems extract fingerprints from audio tracks that reflect audio signal characteristics of the audio tracks. Such fingerprints may be recorded and used in a later matching step to match a new audio clip to known tracks that have been fingerprinted. Such fingerprinting and matching algorithms form the basis of a number of automated processes in modern audio track management systems including copyright infringement detection, original content verification, and content recognition.

In some embodiments, the audio track fingerprinting method uses landmarks in a track's audio signals to obtain a collection of fingerprints that are unique to the track. The method may detect spectro-temporally relevant peaks in a spectrogram of the audio signal and use pairs of such peaks to create a fingerprint. In some embodiments, the track's audio signal may be split into a number of frames (e.g. 512 win_len samples), which are then shifted by a shift length (e.g. 256 win_shift samples). A short time Fourier transform may be computed for the win_len and local peaks in the magnitude spectrum are picked as the landmarks. The selected landmarks may be paired to obtain a tuple of values (peak1, peak2, time distance between the peaks), which collectively defines a single fingerprint.

In some embodiments, records of the fingerprints are stored in a fingerprint table for fast searching, for use to query the fingerprint database. In some embodiments, the fingerprint (peak1, peak2, time distance between peaks) may be converted to an N-bit key value (e.g. a hash value) that corresponds to one of $2^N$ buckets in the fingerprint table. For example, the conversion may encode the peaks peak1 and peak2 using K bits of the key value, and the time distance between the peaks be represented using L bits of the key value. The fingerprint may be converted to an N-bit number (2K+L bits) using the following transformation:

key value($N$ bits)=peak1<<($K$+$L$)bits+peak2<<$L$ bits+time distance where << represents the left bit shift operator. Thus, an N-bit key value can take $P=2^N$ values. These $2^N$ values correspond to buckets in the fingerprint table. In a hash table, the quantity N may be referred to as the hash bit depth. The fingerprint table where the fingerprint entries are stored may be of dimensions M×P, where M is the bucket depth of the buckets. In some embodiment, each entry in the bucket will store a time location of the fingerprint (e.g. the time where the fingerprint appears in the audio track), and an identifier of the audio track (e.g. a file name). In some embodiments, the fingerprinting process may be based on the Shazam fingerprinting algorithm described in the 2003 paper by Avery Wang.

One disadvantage of current fingerprinting and fingerprint storage methods is the huge amount of storage space needed to store the fingerprint entries in the fingerprint table. The vast storage needed by the fingerprint table is due in part to a subset of very common fingerprints that appear extremely frequently in the corpus of audio tracks (e.g. a particular snare drum sound that occurs in many songs). These common fingerprints do not improve the discriminative power of the matching process, since they are almost universally present in most songs. But they account for a large proportion of the storage space used by the fingerprint tables. These fingerprints can cause resource issues at both the fingerprint storage stage and the later matching stage.

For example, some types of database systems impose database record size limits. Common data storage systems in this context persist database records in a "key-value" fashion. These systems may include document-oriented storage systems such as NoSQL databases or document databases. In theory, these databases may support an "infinite" key-space for the buckets in the fingerprint table, which allows for an unlimited number of fingerprint entries per bucket. However, there is a hard limit on the size of individual database records (individual buckets), which constrains the maximum bucket depths for each bucket. Such limits create a crucial bottleneck for large fingerprint databases that store fingerprint records for millions of audio tracks.

Other storage systems such as relational databases have similar limits at the row and column level and have the same bottleneck when persisting fingerprints with high rates of occurrence. Although some database systems do not have record size limits (e.g. certain object-based storage systems), they still suffer from other types of resource challenges that arise from commonly-occurring fingerprints, including increased costs associated with increases in record data transfer (I/O) latency, total record corpus size, record processing memory requirements.

For example, as the database record size (bucket depth) increases, the data transfer latency (time to send/receive a record to/from the database) and cost (price for amount of data transmitted) increases proportionally. This is true regardless of the type of data storage technology, and nearly all Internet service providers and/or cloud infrastructure providers will charge more for increasing amounts of data transferred over a period of time (e.g. monthly). Moreover, as database record sizes increase, the cost-effectiveness of the fingerprinting solution declines. At some point, given a large enough audio track catalog, the solution is no longer cost-effective because the latency to send/receive records will become too large and/or the data transfer cost becomes too great.

Moreover, as database record sizes increase, the total corpus size of fingerprint storage also grows proportionally. This growth is observed regardless of data storage technology. Both on-premise and cloud-provided storage must scale with the corpus size and this comes with increasing costs. At some point, given a large enough audio track catalog, the solution is no longer cost-effective because the total corpus size becomes too large for the storage system.

Additionally, as database record sizes increase, the amount of memory required by the machines to process the fingerprints must increase proportionally. When generating and/or matching fingerprints, processing occurs on machine(s) that do not have infinite memory (e.g. RAM and disk storage). If database record sizes are allowed to grow without limits, eventually the database records will be so large that the machines will no longer be able to handle the records efficiently or process the data with reasonable speed.

In solving the technical challenges in current fingerprinting systems, the inventors recognized that there is a subset of very frequently-occurring fingerprints in the fingerprint table that dominates the size of the buckets in the fingerprint table, while providing very little utility in terms of increasing match accuracy. When a fingerprint occurs so frequently that it is present in almost all audio tracks, it becomes useless in distinguishing one track from another. These commonly-occurring fingerprints can "blow up" their respective buckets, causing a small set of the buckets to become extremely large and unusable.

This intuition was verified empirically in a study performed by the inventors on a song catalog maintained for a production music sharing service. The characteristics of the catalog were follows:
- maximum song duration of 8 minutes
- ~ 4.3 million total songs in corpus
- ~ 5000 fingerprints per song
- 32-bit fingerprints
- 97 million buckets used out of possible 4.3 billion buckets.

The buckets in the fingerprint table used to store fingerprint entries for the corpus had the following bucket depth characteristics:
- mean depth: 192
- standard deviation: 604
- max depth: 40971
- 50th percentile: 8
- 70th percentile: 45
- 90th percentile: 478
- 95th percentile: 1094
- 99th percentile: 2972
- 99.5th percentile: 4033

As can be seen from the bucket depth data, The vast majority of buckets have a bucket depth of less than 10,000. 99.5% of buckets have less than 4,033 entries. The 0.5% buckets that had more than 4033 entries and they amounted to 485,000 buckets out of 97 million buckets used. An entry count threshold may be set to drop buckets of greater than 5,000 from the table. The exclusion of this small percentage of buckets will eliminate most of the resource usage problems in the system without causing significant impacts on matching accuracy.

Accordingly, based on these observations, embodiments of the disclosed audio track management system implement a number of optimization techniques to improve resource usage in current fingerprinting systems. In some embodiments, the disclosed audio track management system discards commonly-observed fingerprints (e.g. fingerprints whose entries are assigned to very large buckets), so as to limit the storage space usage by the fingerprint table and reduce memory requirements of the machines that processes the fingerprint entries. Advantageously, the optimizations will only drop a small proportion of fingerprints that are not useful for the matching process, and retain the fingerprints that are the most discriminative for distinguishing among audio tracks in the corpus.

In some embodiments, counters are used to track the entry count of each bucket in the fingerprint table. In some embodiments, the counter may be incremented substantially real time every time a fingerprint entry is added to a particular bucket. In other embodiments, the counts may be updated at a later time, for example, in response to a later-occurring event or according to a regular update schedule. The counts may be stored as bucket metadata, which may be part of the fingerprint table data structure or stored separately as a side data structure (e.g. a counter array).

Depending on the embodiment, the bucket data may store a count-based metric of each bucket, such as the proportion or percentage of total fingerprint entries stored in each bucket (e.g. a ratio of the entry count of the bucket to the total entry count of the fingerprint table), or a entry count rank or quantile of the bucket.

In some embodiments, in a first optimization technique, when an entry count of a bucket reaches a first threshold, the system will begin to overwrite the entries in that bucket. For example, if the first threshold is set at 100 for a bucket, the 101st entry added to the bucket will overwrite an existing entry in the bucket. In some embodiments, the overwriting may be performed to simulate a circular buffer, where each overwrite is performed on the oldest entry in the bucket. In other embodiments, the overwriting may be performed randomly. The overwriting may lead to some missed fingerprint matches in the matching step. However, since the matching step is not overly dependent on any one particular fingerprint (especially high-occurrence fingerprints that do not have much discriminative power), loss of some fingerprint entries will not have significant impacts on match accuracy. In some embodiments, the first threshold may be determined empirically based on an accuracy study, and the bucket depth of all buckets in the fingerprint table will be set at the first threshold so that the storage space used by the fingerprint table is bounded.

In some embodiments, in a second optimization technique, once the entry count of a bucket reaches a second threshold, the bucket is added to a drop list (e.g. a bucket array) so that the bucket is not used by the matching process. The drop list may also be kept as part of the bucket metadata of the fingerprint table. The drop list contains the list of all buckets or fingerprints that are observed with unacceptably high frequency. Once a bucket or fingerprint is very frequently observed, it stops being discriminative in nature and hence is less useful in the matching step. Thus, removing the entire bucket of fingerprint from the matching process leads to an improvement in speed of the matching without losing accuracy. The second threshold may be configurable by the user or automatically set by the system. In some embodiments, the second threshold may be set based on the accuracy requirements of the matching process and/or resource constraints of the system such as the storage limit of individual buckets. In one embodiment, the second threshold is set at twice the value of the first threshold.

In some embodiments, even after a bucket is added to the drop list, the system will continue to update the counter, so that the counter value can be used for later statistics-based analysis or control of the buckets. For example, in some embodiments, buckets added to the drop list will be moved to a secondary storage distinct from the primary storage system that is used to store the fingerprint table. The fingerprint database system may use updated bucket count statistics to determine, at a later time, to restore a dropped bucket from the secondary storage back to the fingerprint table stored at the primary storage system. In some embodiments, the secondary storage may not impose record size limits on the buckets (or have looser limits), so that the buckets can grow to larger sizes (possibly indefinitely) without data loss. In some embodiments, the bucket data at the secondary storage is not used for track matching.

After a bucket is added to the drop list, at the matching step, the fingerprint matching system will check whether a key value of a query track is present in the drop list. If it is not present, the system uses that key value for the matching process. However, if it is present in the drop list, the system drops that key value from the matching process completely, thereby saving the system from spending additional time and processing power to process that key value.

In one study, the inventors implemented the two optimization techniques to fingerprint a database of 18,334 songs. The study used a 20-bit key value for individual tracks, which means that the fingerprint table had 1,048,576 buckets.

The study started with a bucket depth of 100 entries per bucket initially. The bucket depth was then reduced to 75 and 50 using the first threshold for overwriting bucket entries, as discussed above. As can be seen in the table below, these modifications allow for a significant reduction in the amount of data stored in the fingerprint table, and cause only small drops in the overall accuracy of the matching process. In a production system, these types of studies may be repeated automatically (e.g. using randomly generated query audio clips) to periodically adjust the threshold values of the optimizations to maintain a desired level of match accuracy.

| Bucket Depth | Entries Dropped (%) | Overall Accuracy (%) |
|---|---|---|
| 100 | 10.9 | 99.95 |
| 75 | 21 | 99.875 |
| 50 | 41.7 | 99.75 |

The study next performed the bucket dropping technique discussed above and adjusted the second threshold. The table below shows the results of these adjustments, including the savings in storage, in terms of buckets and bucket entries, as well as performance as the non-discriminative fingerprints are dropped from the matching phase. As can be seen, when the top 5% of buckets are dropped, the number of fingerprints stored in the fingerprint table drops from 74.8 million to 63.1 million, which is a saving of 15.6% in storage space with only a negligible loss of accuracy.

| Buckets Dropped (%) | Entries (in Millions) | Overall Accuracy (%) |
|---|---|---|
| 0 | 74.8 | 99.85 |
| 0.5 | 71.7 | 99.85 |
| 1 | 70.3 | 99.85 |
| 2 | 68.2 | 99.85 |
| 5 | 63.1 | 99.825 |

In some embodiments, a third optimization technique may be implemented at the matching stage. In this optimization, the fingerprint matching system chooses the most discriminative of fingerprints from the query audio track to be used to look up matching fingerprint entries in the database. In some embodiments, this selection is accomplished by sorting the number of raw matching buckets in an ascending order based on their associated bucket sizes and dropping some specified percentage of the top-ranked buckets in terms of their bucket size. So, for example, suppose the system extracts a set of fingerprints $F=\{f1, f2, \ldots, fn\}$ from the query audio track. Suppose the entry counts of buckets corresponding to these fingerprints in the fingerprint table are $C=\{c1, c2, \ldots, cn\}$. The fingerprint matching system sorts F in an ascending order according to the counts in C. The system then chooses a subset of the fingerprints F corresponding to a specified rank threshold (e.g. 50%) to perform the matching. Note that the selected subset is the most discriminative set of fingerprints in F to perform the matching, while those that are less discriminative are discarded. By reducing the query fingerprints in this manner, the system is able to reduce the search space and avoid performing unfruitful computations in the matching step, to reduce resource usage and speed up the matching process.

As will be appreciated by those skilled in the art, embodiments of the optimization techniques described herein are implemented in specialized computer systems designed to perform fingerprint generation and matching for digital audio tracks. These optimization techniques improve the functioning of current systems, enabling such systems to reduce usage of storage space, memory, processing power and increase the speed of matching, while maintaining matching accuracy. The optimization techniques are practical applications of computer technology to solve technical problems at arise in real-world computer systems, and go beyond abstract concepts such as bare mathematical formulas/relationships, human mental or pen-and-paper processes, methods of organizing human activity such as fundamental economic practices, or any other types of exceptions to patent-eligible subject matter recognized by the courts. These and other features and advantages of the disclosed techniques are discussed in further detail below, in connection with the figures.

FIG. 1 illustrates an audio track management system that performs optimization operations to improve resource usage and system performance during audio track fingerprinting and matching, according to some embodiments.

As shown, the figure depicts an audio track management system 100 that performs fingerprint generation and matching for audio tracks. In some embodiments, the system 100 may be a music storage, cataloging, and/or streaming service that allows users to download or stream audio tracks of songs on the users' personal devices via the Internet, or upload song tracks to the service. As shown, the system 100 implements a fingerprint database 120 for receiving audio tracks 110 and generating and storing fingerprint records of audio tracks. The system 100 also implements a fingerprint matching system 170 for matching query tracks (e.g. new song clip) to known audio tracks whose fingerprint records are stored in the fingerprint database system. In some embodiments, results produced by the fingerprint matching system 170 may be used to perform certain automated tasks in the system 100 such as copyright infringement detection, original content verification, content recognition, and other types of audio data analysis or report generation. The components of the audio track management system 100 may be implemented as individual software modules and/or executed on individual hardware systems (e.g. separate computing servers). In some embodiments, the compute resources of the system 100 may be provisioned in a cloud-based infrastructure provider network. The infrastructure provider network may be responsible for providing virtualized compute and storage resources to various clients (e.g. virtual machine instances, container instances, and storage repository instances), isolating access of these resources to the clients, and managing the resources on behalf of clients (e.g. performing health monitoring, security controls, and auto-scaling on the resources).

In some embodiments, the fingerprint database system 120 may provide a track uploading interface 122 for receiving new audio track(s) 110 to be added to the fingerprint database system 120. Depending on the embodiment, the interface 122 may be implemented as a programmatic interface such as a web service or an API, or an interactive interface such as a CLI or a GUI. In some embodiments, interface 122 may be a browser-based service console of the system.

As shown in this example, the new audio track 110 is first processed by a fingerprint extraction component 124a to extract a set of fingerprints of the audio track. These fingerprints may encode characteristics of the audio signal of the track at various time points in the track. The set of fingerprints, along with their time locations in the track, may be used to uniquely identify the track 110. In some embodiments, the extracted fingerprints are converted into respective key values (e.g. hash values), so that records of the fingerprints can be added to corresponding buckets 142a-n of a fingerprint table 140. Depending on the embodiment, these buckets may be implemented as hash buckets or key-based shards or partitions of the table, These individual portions of the fingerprint table may be individually constrained in terms of size. The fingerprint table 140 will contain fingerprint records of all known audio tracks fingerprinted by the fingerprint database system 120, so that these records can be later used to match query tracks to known tracks that were previously fingerprinted.

As shown, the key values of the fingerprints are written to the fingerprint table 140 by a fingerprint table writer 130. Depending on the embodiment, the fingerprint table 140 may be stored in a data storage system such as a NoSQL database or document storage system, a relational database system, or simply a file system. The data storage system may provide a key-value access semantic, where the buckets 142a-n of the fingerprint table 140 are stored as the values, and their key values are used as the keys.

In some embodiments, the fingerprint table writer 130 will add 131 an entry for each fingerprint into corresponding buckets of the fingerprint table 140. A bucket entry will indicate the presence of the fingerprint. The bucket that is written is selected according to the key value of the fingerprint. In some embodiments, each bucket entry in the fingerprint table will indicate a unique identifier of the audio track 100 and a time location where the fingerprint appears in the audio track.

As shown, in some embodiments, the fingerprint table writer 130 will update 133 bucket metadata 150 associated with the fingerprint table 150. In some embodiments, the bucket metadata 150 may store statistical and/or control metadata for each bucket in the fingerprint table. In some embodiments, the update operation 133 will increment a counter associated with every bucket that was written to maintain up-to-date entry counts of the buckets. The bucket metadata 150 may be stored as part of the fingerprint table 140 (e.g. as a single database table), or as a different data structure or object (e.g. a separate table or file).

The bucket metadata 150 may store a variety of different count-based metrics 152 of individual buckets in the fingerprint table, which may include raw entry counts, normalized counts (e.g. a proportion of total entries of the fingerprint table that are stored in a bucket), an entry count rank, and/or an entry count quantile of a bucket. In some embodiments, the count-based metrics 152 may be updated immediately when an entry is added to a bucket. In some embodiments, the count-based metrics 152 may be updated at a later time, for example, on a periodic schedule. For example, the system 120 may update the raw counter value of each bucket immediately after the buckets are updated, but recalculate the count ranks of the buckets periodically.

As shown, in some embodiments, the system 120 implements a bucket optimizer component 160 that performs different types of optimizations on individual buckets 142 based on the count-based metrics 152. Different types of optimization actions may be triggered 163 when the count-based metric of a bucket reaches different counts threshold 162. These action trigger thresholds may be specified via user configuration, or programmatically determined based on runtime conditions observed by the system 120. In some embodiments, the thresholds 162 may be set based on empirical studies or evidence, to balance the tradeoff between resource usage of the database system 120 (e.g. storage space usage) and the match accuracy of the fingerprint match system 170.

In some embodiments, when the count-metric of a particular bucket 142 reaches a first threshold 162, the bucket optimizer 160 will perform an optimization operation 165 to cause the fingerprint table writer 130 to start overwriting entries in that bucket. As discussed, when a bucket overflows, it is likely that some fingerprints in the bucket have a very high occurrence rate, which are no longer contributive during the matching process. Thus, the discarding of entries in the overflowed bucket is not likely to cause significant impacts on match accuracy.

In some embodiments, the optimization operation 165 may set a "next write location" pointer or address of the bucket so that the next entry added to the bucket will overwrite the address of an existing entry in the bucket. In some embodiments, the optimization operation 165 may also set a flag in the bucket metadata 150 to indicate that that bucket has overflowed and is being overwritten. Such a flag may be informative to the later fingerprint matching process, for example, to determine how to treat missed fingerprint matches in the overflowed bucket.

The manner of overwriting may vary depending on the embodiments, or based on system configuration settings. In some embodiments, the overwriting may be performed to mimic a circulate buffer, where every new entry to the bucket overwrites the oldest entry of the bucket. In some embodiments, the fingerprint table writer 130 may randomly select the existing entry to overwrite. In some embodiments, the fingerprint table write may make a randomized decision as to whether a new entry should overwrite an existing entry or simply be discarded without being recorded. In some embodiments, the overwriting decision may take into account certain other factors, such as the track associated with the entry. For example, the system may prefer to retain a fingerprint entry associated with a frequently-searched song over another fingerprint entry of an unpopular song.

In some embodiments, when the count-metric of a particular bucket 142 reaches another count threshold 162, the bucket optimizer 160 will perform another optimization operation 167 to drop the bucket entirely so that it is excluded from the downstream matching process. In some embodiments, optimization operation 167 may be implemented as a second step after the initial optimization operation 165, and the count threshold that triggers optimization 167 is higher than the count threshold that triggers optimization 165. In one embodiment, the count threshold for optimization operation 167 is twice the count threshold of optimization operation 165 (e.g. twice the maximum bucket depth of the fingerprint table).

In some embodiments, to drop a bucket, the bucket optimizer 160 will add the bucket to a drop list that will be checked by the fingerprint matching system 170 during the match process. As shown, in some embodiments, drop list 154 may be stored as part of the bucket metadata 150. In some embodiments, the drop list 154 may be stored as a separate data array. In some embodiments, the fingerprint database system 120 may maintain multiple drop lists 154 of buckets, for example, corresponding to multiple size levels of the buckets.

In some embodiments, after a bucket 142 is added to the drop list 154, the system will continue to update the counter of that bucket. In this way the true entry count of the bucket is maintained, so that this information can be used for later analysis or system control decisions. In some embodiments, after a bucket is added to the drop list, the fingerprint table write may stop updating the bucket to add any further entries, so as to avoid wasting compute power or resources during the fingerprint generation process. In some embodiments, after a bucket is added to the drop list, bucket data associated with the dropped bucket may be moved to a secondary storage system distinct from the primary storage system used to store the fingerprint table 140. The copy of the bucket data at the secondary storage may continue to be updated as new fingerprint entries are received. The secondary storage may allow for cheaper growth of the bucket data and, in some embodiments, will not be used by the fingerprint matching system to perform track matching.

As shown, the audio matching system 170 may operate alongside the fingerprint database system 120, as either a separate execution service or a single monolithic system that includes the fingerprint database system. In some embodiments, the audio matching system 170 may be implemented as software that is separate from the software of the fingerprint database system 120, or executed on hardware systems that are distinct from the hardware of the fingerprint database system.

As shown, in some embodiments, the audio matching system 170 is configured to receive query request(s) 174 via a query interface 172, and output query result(s) 198 in response to the queries. As with the track uploading interface 122, the query interface 172 may be implemented as a programmatic interface such as a web service or an API, or an interactive interface such as a CLI or a GUI. In some embodiments, interface 172 may be implemented as part of the track uploading interface 122. For example, the audio track management system 100 may automatically perform a query 174 for each newly uploaded track 110, to check whether the new track contains audio content that is present in any known tracks previously fingerprinted.

In some embodiments, a query request 174 may specify a query audio track to be matched against the library of known audio tracks in the fingerprint database system 120. The query result 198 of the query 174 will indicate one or more known tracks that were identified as a match to the query track, or that no matches were found. As shown in this example, the query track is processed by a fingerprint extraction component 124b to extract a set of query fingerprints 180. The fingerprint extraction process is the same fingerprint extraction process performed by the fingerprint database system 120, and in some embodiments, fingerprint extraction components 124a and 124b may be the same component.

In some embodiments, the fingerprint matching system 170 implements a query optimization component 190 that performs an optimization operation on the query to drop 193 a subset of fingerprints from the query fingerprint set 180. As shown in this example, the initial query fingerprint set contains fingerprints 182a-c, and fingerprint 182c is dropped by the optimization. By reducing the number of fingerprints that are used during the matching/query processing, the system 170 is able to use less resources for the process and return the query result 198 more quickly. As with the optimization operations performed by the fingerprint database system 120, the query optimization will drop high-occurrence fingerprints that do not contribute to match accuracy, so that the overall accuracy level of the query 174 is not unduly sacrificed.

To select a subset of the query fingerprints 182 to drop, in some embodiments, the query optimizer 190 will first generate key values of the query fingerprints (e.g. hash values) to identify corresponding buckets of the fingerprints in the fingerprint table 140. These key values are then used to look up the bucket metadata 150 maintained by the fingerprint database system for each of the query fingerprints. At this stage, if a query fingerprint corresponds to a dropped bucket in the drop list 154, that fingerprint will be excluded from the match process. In addition, the query optimizer 190 will perform another filtering step 193 to drop query fingerprints 182 that are associated with buckets with the highest count-based metrics 152.

To perform the count-based filtering step 193, in some embodiments, the query fingerprints 182 are ranked according to the count-metrics 152 of their associated buckets (e.g. in an ascending order of the entry counts of their buckets). A rank threshold 192 is then applied to identify and drop those fingerprints that exceed the threshold (e.g. fingerprints that are in the top 50% in the set 180 in terms of associated bucket size). The remaining fingerprints in the query fingerprint set 180 are then provided to a fingerprint lookup and analysis component 194, which performs lookups 195 on the fingerprint table 140 using the query fingerprint key values. The lookup results are used to determine whether the query track sufficiently matches a known track. In some embodiments, the number of lookups 195, resources consumed by the lookups 195, and or amount of time used to perform the lookups 195 are reduced as a result of the query optimization.

The manner that query fingerprints are selected for dropping may vary based on the embodiment. In some embodiments, the optimizer 190 may use an absolute threshold based on count-based metric values instead of a rank threshold 192. In some embodiments, the bucket size rankings may be determined globally for all buckets in the fingerprint table 140 and stored by the fingerprint database system, so the query fingerprints are not explicitly sorted during the query optimization. In some embodiments, threshold(s) used to drop query fingerprints may be determined or adjusted dynamically by the query matching system. For example, the threshold 192 may be determined based on a configuration parameter, changing statistical measures stored by the bucket metadata 150, or current execution conditions of the system 170.

In some embodiments, the threshold(s) 192 may be specified by or determined based on the query request 174. For example, the query request 174 may specify to drop a particular percentage of fingerprints, as a query parameter. As another example, the query request 174 may specify a desired accuracy level for the query, and the system 170 will determine the threshold 192 based on the specific accuracy level. In some embodiments, the fingerprint database system may maintain a performance table that maps different amounts of fingerprint drops to match accuracy levels, so that the fingerprint matching system can use such information to dynamically select the query-time drop thresholds. In some embodiments, the fingerprint database system may periodically update the performance table based on results of synthetic queries (e.g. using randomly generated query audio clips).

Figure 2:
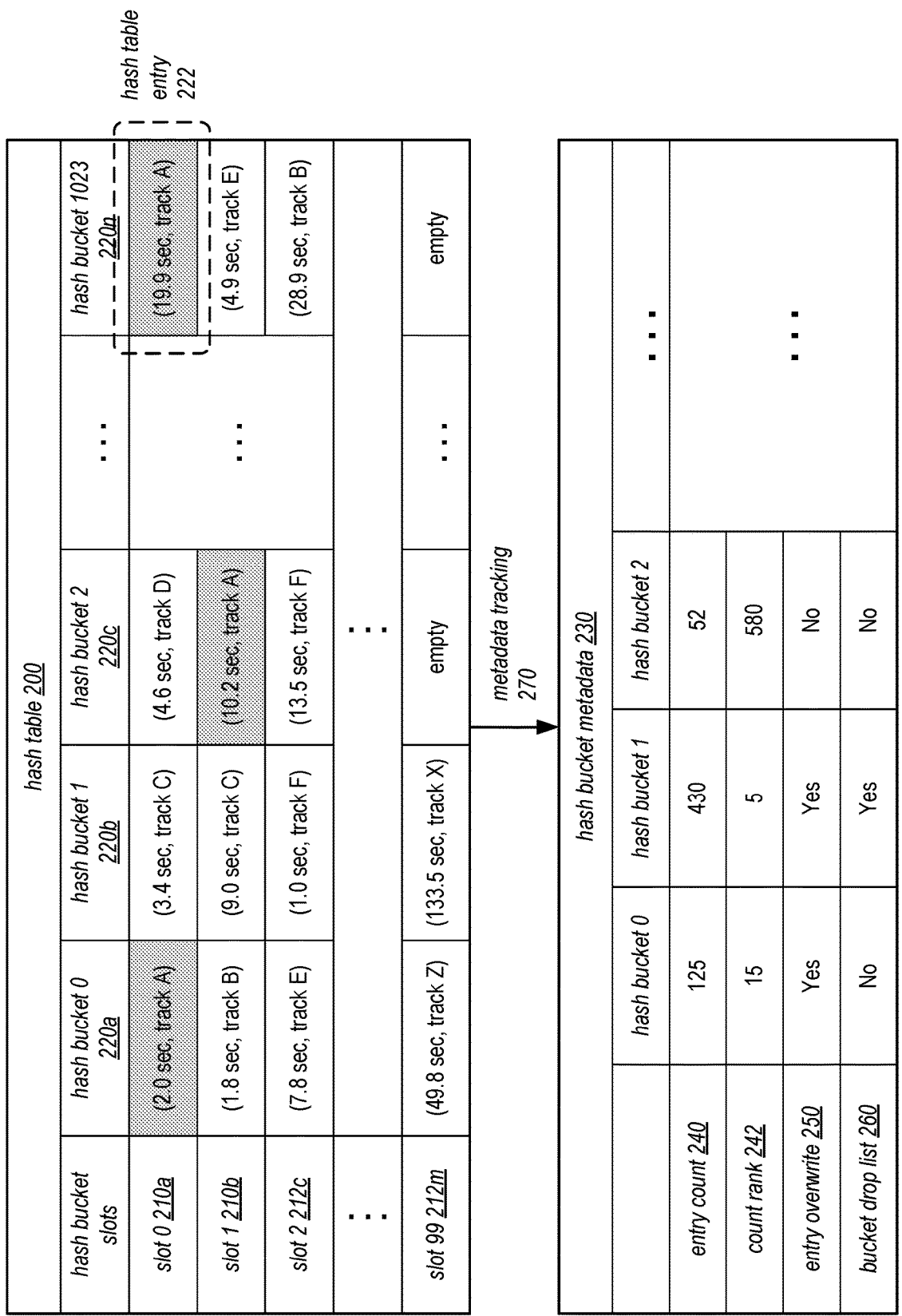
FIG. 2 illustrates a hash table used by the audio track management system to store fingerprint entries and hash bucket metadata maintained for the hash table, according to some embodiments.

FIG. 2 illustrates a hash table used by the audio track management system to store fingerprint entries and hash bucket metadata maintained for the hash table, according to some embodiments.

The top of the figure depicts an embodiment of the fingerprint table 140, here implemented as a hash table 200. As shown, the hash table 200 includes an array of hash buckets 220a-n used to store fingerprint entries. If the hash values of the fingerprints are encoded as 10-bit hash strings, there will be 1024 individual hash buckets 220 in the table. As shown, each hash bucket 220 in the table has a number of hash bucket slots 210a-m. In this example, every hash bucket has the same number of bucket slots, and the number of bucket slots may be referred to as the bucket depth of the hash table. In some embodiments, different hash buckets may be associated with different bucket depths. In some embodiments, the bucket depths may be set via user configuration, and may be selected based on the storage constraints of the fingerprint database system (e.g. the maximum bucket record size of the database system used to store the hash table). Additionally, the bucket depths may be selected to maintain a minimum match accuracy of the fingerprint matching system, which may be determined based on empirical testing.

As shown, in this example, each hash table entry 222 in the hash table 200 stores a tuple of attributes of the fingerprint. The attributes include an identifier of the associated track where the fingerprint appears (e.g. a unique file name), and time value indicating the location in the track where the fingerprint appears. In some embodiments, the matching process will take into account not only the presence of fingerprints in the two audio tracks, but also the timestamps of those fingerprints. For example, embodiments of the matching process may involve extracting a fingerprint sequence of a known track (e.g. the colored entries for track A), which indicates the time sequence of the fingerprints and the relative time lapse between the fingerprints. This fingerprint sequence can be matched to the fingerprint sequence of the query track to determine a match score of the two tracks.

As shown, as the hash table 200 changes, metadata tracking 270 is performed to track hash bucket metadata 230 of the hash table 200. The hash bucket metadata 230 is an embodiment of the bucket metadata 150 of FIG. 1. As discussed, the tracking 270 may be performed immediately as the hash buckets 220 are updated, or at a later time (e.g. periodically or in response to events). As shown, the hash bucket metadata 230 may include different types of metadata about the hash buckets. In this example, entry count 240 and count rank 242 represent two different types of count-based metrics that may be maintained for each hash bucket. In other embodiments, the hash buckets may be assigned to a set of bucket classes or categories based on their entry counts, which may be determined empirically.

Attributes 250 and 260 represent two types of optimization control parameters of the hash buckets, which may be used by the bucket optimizer 160. In this example, the entry overwrite flag 250 may be set by optimization operation 165, when overwriting is enabled on the hash bucket. This flag indicates that there is some data loss associated with the hash bucket, and may be used by the fingerprint matching process to adjust the match score between two tracks. In some embodiments, the entry overwrite flag 250 may be a numerical value that indicates the number times that the hash bucket has been completely rewritten.

In this example, the bucket drop list 154 of the hash table 200 is indicated by the bucket drop list flag 260. Here, any bucket that indicates a Boolean value of "Yes" is in the drop list. In some embodiments, the hash bucket metadata 230 may indicate multiple drop lists, which may correspond to different levels of match accuracy.

Figure 3:
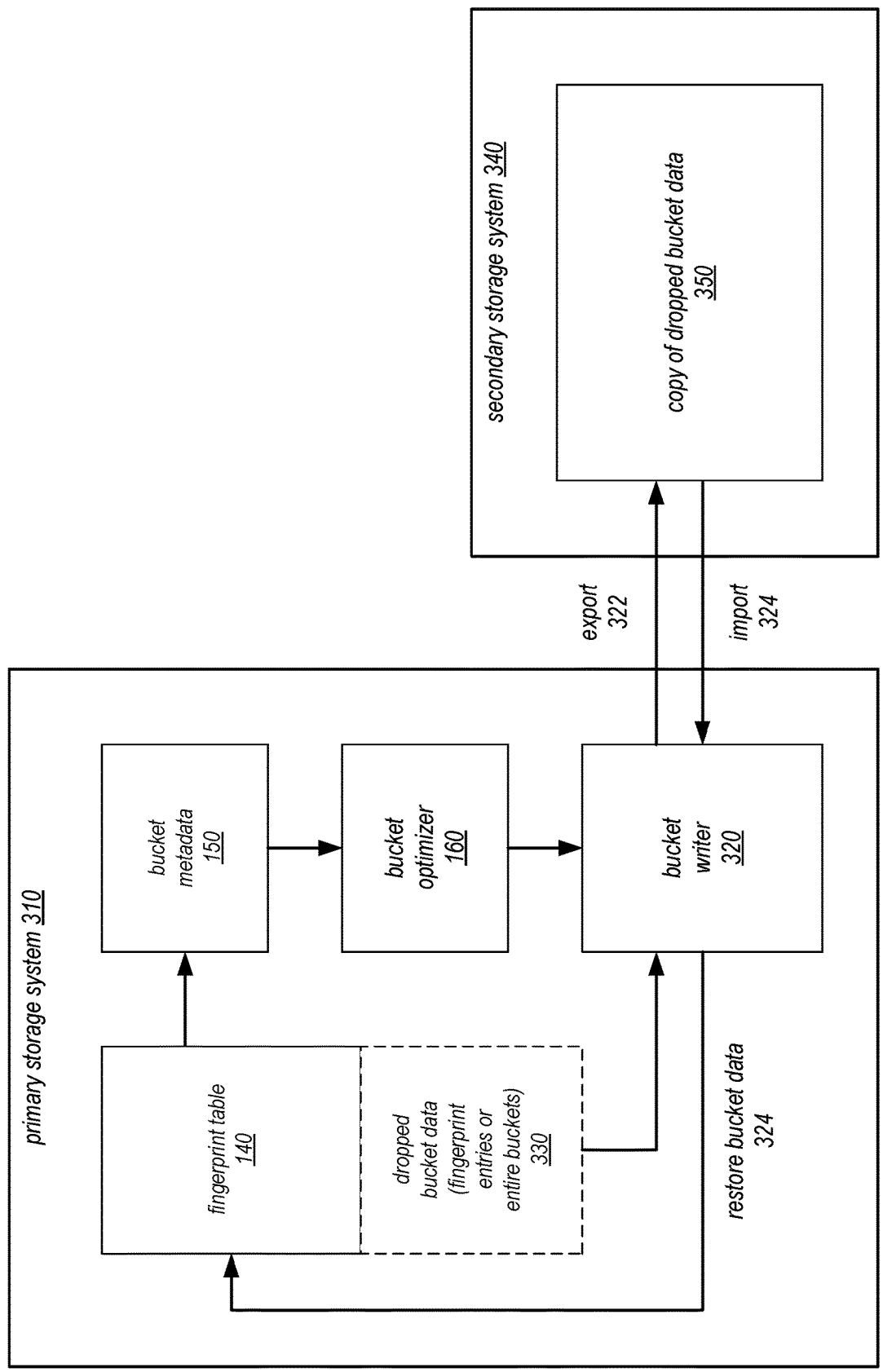
FIG. 3 illustrates use of a secondary storage system to store data dropped from the fingerprint table of the audio track management system, according to some embodiments.

FIG. 3 illustrates use of a secondary storage system to store data dropped from the fingerprint table of the audio track management system, according to some embodiments.

As shown in this example, an embodiment of the fingerprint table 140 of the fingerprint database system 120 is stored at a primary storage system 310 (e.g. a database or some other type of storage system). In some embodiments, the primary storage system 310 may be one that is suited for fast querying but relatively expensive in terms of costs and/or storage space limits. On the other hand, a secondary storage system 340 is a different type of storage system that may be suited for cheap, long-term storage of data, but not well suited to handle large amounts of query requests efficiently.

As shown, the primary storage system 310 and secondary storage system 320 are combined in this example to achieve the bucket optimizations in the fingerprint database system 120 discussed previously, while avoiding permanent data loss from the fingerprint table 140. In some embodiments, when bucket data 330 is dropped for a bucket (either bucket entries per optimization operation 165 or the entire bucket per optimization operation 167), the bucket optimizer 160 will instruct the bucket writer (320) or some other component of the fingerprint database system 120 to export 322 the dropped bucket data 330 to the secondary storage system 340, where a copy of the dropped bucket data 350 is kept. In some embodiments, the copy of the bucket data 350 will continue to be updated as new entries are added to the bucket, but these updates will not be performed in the primary storage system 310. Thus, the secondary storage system 340 will allow the bucket to continue to grow in size, possibly indefinitely, on storage that is better able to handle the storage requirements of very large buckets. In some embodiments, the bucket data 350 stored in the secondary storage system 340 will not be used to perform tracking matching.

In some embodiments, the bucket optimizer 160 may cause the dropped bucket data to be brought back from the secondary storage system 340 into the fingerprint table 140 via a restore operation 324. As shown, the restore operation may involve the bucket writer 320 performing an import 324 of the dropped bucket data back into the primary storage system 310. A restore operation 324 may be performed based on configured policies and/or current system conditions in the fingerprint database system, or manually in response to a user command. For example, in some embodiments, a bucket may be restored when a re-ranking of the buckets in the table is performed based on a set of bucket ranking parameters. As another example, in some database systems that support table auto-scaling, a previously dropped bucket may be restored when the size limit of the fingerprint table is increased by an auto-scaling operation.

Figure 4:
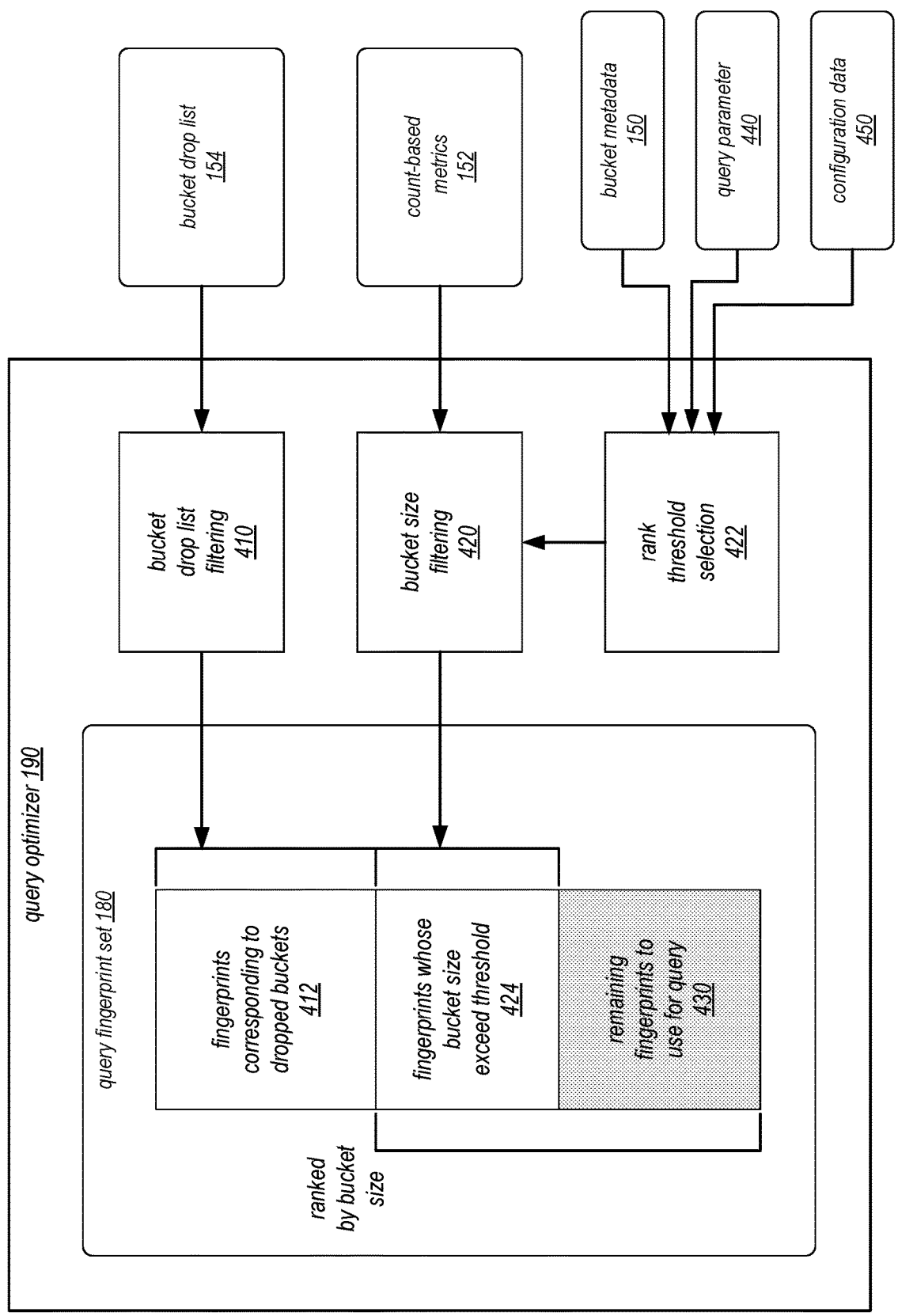
FIG. 4 illustrates details of the query optimizer of the audio track management system, according to some embodiments.

FIG. 4 illustrates details of the query optimizer of the audio track management system, according to some embodiments.

As shown, the figure depicts an embodiment of the query optimizer 190 of FIG. 1. In this example, the query optimizer 190 will perform two filters of the query fingerprint set 180 to reduce the query fingerprint set. In the first filtering operation 410, the query optimizer identifies all fingerprints 412 that correspond to a dropped bucket in the bucket drop list 154. In some embodiments, the query optimizer may obtain at query time or cache a copy of the bucket drop list 154, and use the list to identify all query fingerprints 412 whose buckets have already been dropped by the fingerprint database system.

In the second filtering operation 420, the remaining fingerprints in the query fingerprint set 180 is further reduced based on their associated bucket sizes. In this operation, the query optimizer may obtain at query time or cache a copy of the count-based metrics 152 maintained by the fingerprint database system. The fingerprints in the query set are then ranked by their respective bucket sizes. A rank threshold is dynamically selected 422 at query time, and applied to the ranked list of fingerprints to identify a subset of the fingerprints whose bucket size exceeds the rank threshold. This subset of fingerprints 424 is again removed from the query set, so that only the last remaining fingerprints 430 that are below the rank threshold are used to perform the query.

As shown, the dynamic selection 422 of the rank threshold may be made based on a variety of factors, depending on the embodiment and/or configuration of the fingerprint matching system. In some embodiments, additional types of bucket metadata 150 may be used as a factor to determine the threshold. For example, bucket distribution measures regarding track variety, lookup frequency, and/or match utility of individual buckets may be used. In some embodiments, some of such bucket metadata 150 may be collected by the query optimizer 190 and recorded back to the fingerprint database system.

In some embodiments, query parameters 440 associated with the query itself may be used to determine the threshold. For example, the query may actually specify to use only the top 80% of fingerprints extracted from the query track to perform the query. As another example, the query may specify a desired match accuracy requirement, and the query optimizer will select the fingerprint drop threshold based on the desired match accuracy requirement. As yet another example, the query may specify a query parameter to match only a particular category of audio tracks (e.g. only country songs). The query optimizer may use such information to compute a bucket selection metric that selects the best set of query fingerprints for the specified category of tracks.

Finally, in some embodiments, the rank threshold selection may be controlled by user configuration data 450. For example, in some embodiments, the query optimizer 190 may be configured to automatically select a threshold value based on a default level of match accuracy. In some embodiments, the configuration data may specify to raise or lower the drop threshold based on the current level of resource usage in the system. For example, when the fingerprint database system is under heavy load, the query optimizer may automatically raise the drop threshold to reduce the number of lookups to the database system. In some embodiments, the configuration data 450 may be client configuration data specific to the query client.

Figure 5:
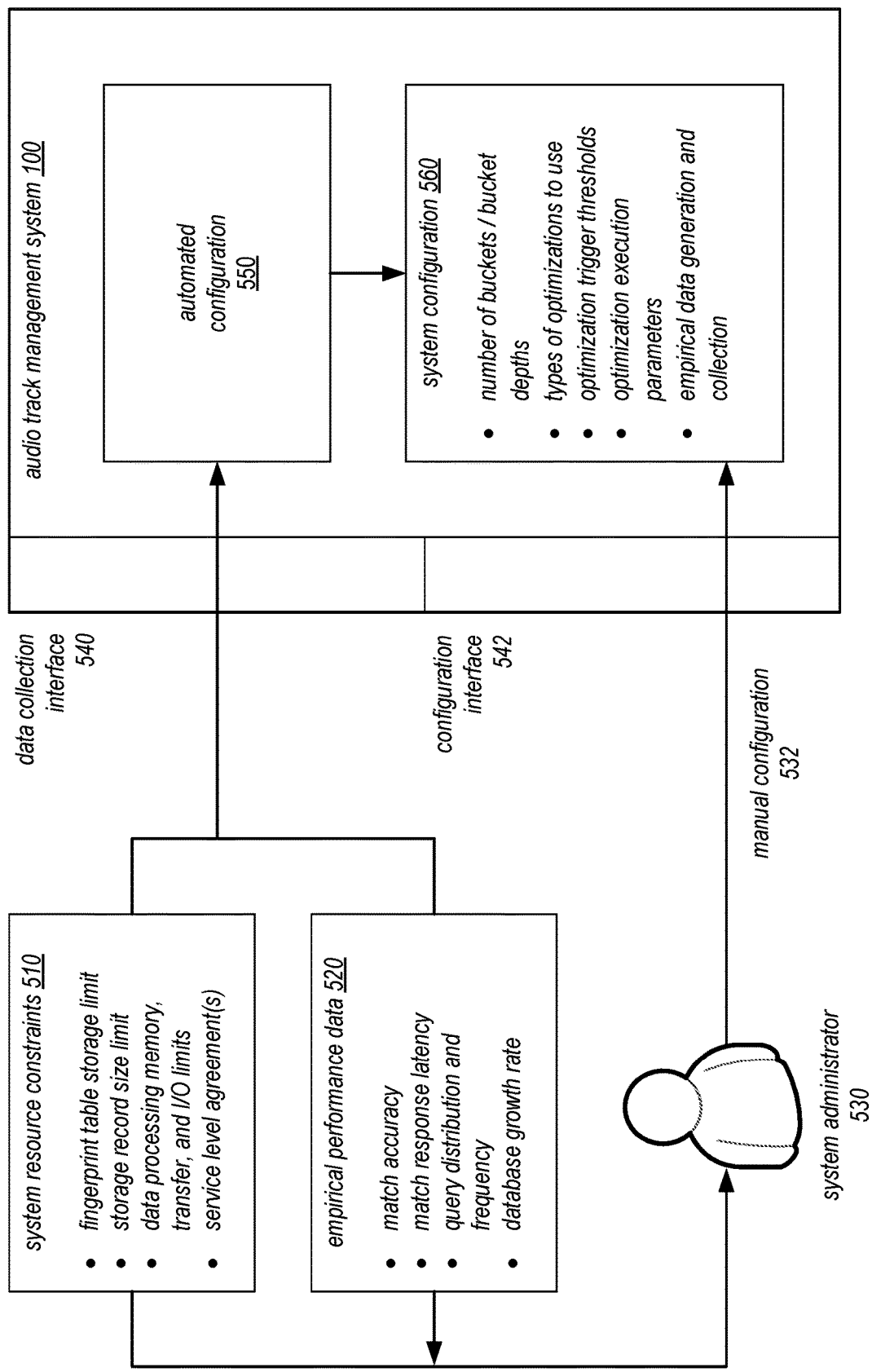
FIG. 5 illustrates different types of data that may be used to control configuration of optimization operations in the audio track management system, according to some embodiments.

FIG. 5 illustrates different types of data that may be used to control configuration of optimization operations in the audio track management system, according to some embodiments.

In some embodiments, configuration settings of the audio track management system 100 may be set based on different types of system resource constraints 510 and/or certain empirical performance data 520. The system configuration settings 560 may be set manually 532 by a system administrator 530 via a configuration interface 542 of the system, or controlled programmatically by an automated configuration component 550, which may be implemented as part of the audio track management system.

The system resource constraints 510 may include various types of constraints or limits on the system's resource usage, such as a storage space limit of the fingerprint table, a storage record size limit (e.g. for individual buckets), various limits of the underlying compute resources or execution environment such as data processing memory limits, data transfer limits, and I/O limits, and service requirements specified in various service level agreements. As one example, the bucket count and bucket depth of the fingerprint table may be configurable parameters of the fingerprint table, and such parameters may be dependent on fingerprint table storage or bucket record size limits imposed by the database system. As another example, the bucket optimization or query optimization thresholds may be set based on the system resource constraints 510.

The empirical performance data 520 may be generated as the result of a manual study, for example, to quantify the effects of optimization techniques on the system's resource usage and match accuracy. In some embodiments, these studies may be repeated automatically, for example, on a periodic basis using synthetic test data (e.g. randomly generated query clips). Example types of empirical data 520 that may be gathered include track match accuracy, match response latency, the query distribution and frequency, and fingerprint database growth rates and trends. The gathered empirical data 520 may be provided via a user interface to the system administrator 530 when making system configuration adjustments, or be programmatically consumed by the automated configuration component 550 via a data collection interface 540 of the system 100.

As shown, the system 100 may expose a host of configurable settings as part of the system configuration data 560. For example, the configurable settings may include the bucket count and bucket depths of the fingerprint table, the types of optimizations used by the system (e.g. bucket optimizations or query optimizations), the trigger thresholds for the optimizations, as well as other types of execution parameters of the optimizations. In an embodiment where the system uses multiple bucket drop lists, the configuration data 560 may indicate the conditions when buckets are added to each drop list. In embodiments where the bucket metadata is updated asynchronously from bucket updates, a configuration setting may indicate the frequency or triggering condition of metadata updates. In embodiments where dropped bucket data are moved to secondary storage, the configuration data may indicate when or how the data is exported or imported for bucket restoration. In a last example shown in the figure, in embodiments where the system collects or generates empirical data (e.g. periodic accuracy surveys), the configuration settings may specify how or when such collection or generation will occur. As will be appreciated by those skilled in the art, the types of configurations shown here are provided for illustrative purposes, and other types of configuration settings may be exposed by the system depending on the embodiment.

Figure 6:
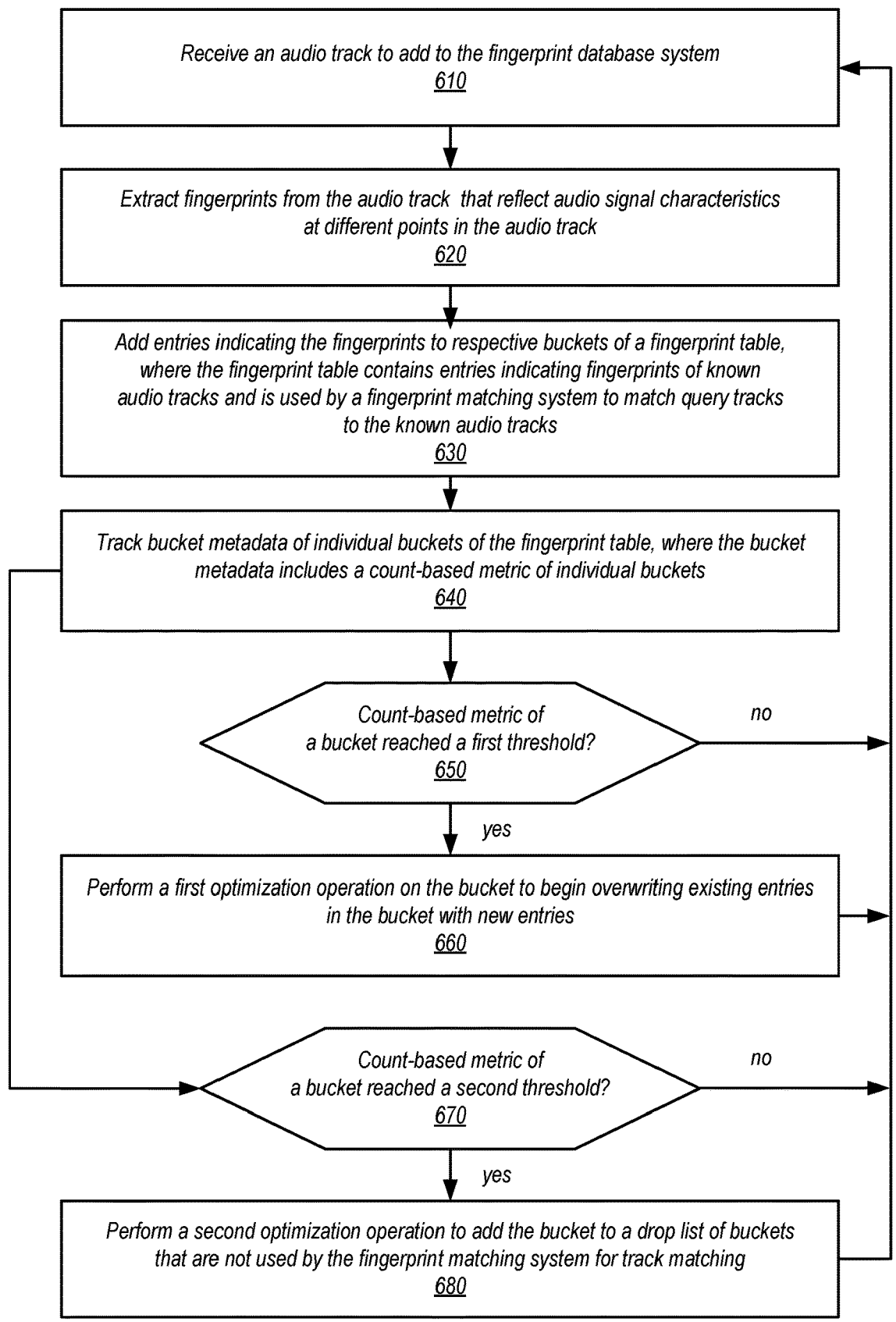
FIG. 6 is a flowchart illustrating a process of adding fingerprints to the fingerprint database of the audio track management system, according to some embodiments.

FIG. 6 is a flowchart illustrating a process of adding fingerprints to the fingerprint database of the audio track management system, according to some embodiments.

The process begins at operation 610, where an audio track (e.g. audio track 110) to be added to the fingerprint database system (e.g. database system 120) is received. As discussed, the fingerprint database system may be configured to receive uploads of audio tracks (e.g. songs) via an upload interface, and add the track to a catalog of known audio tracks by recording a set of fingerprints of the track. The records of the fingerprints may be used to identify a match between two audio tracks, which may be used as the basis for automated copyright infringement detection, original content verification, or content recognition.

At operation 620, fingerprints are extracted from the audio track, which reflects audio signal characteristics at different time points in the audio track. For example, each fingerprint may be computed based on a selected pair of signal peaks in the audio track and the time distance between the peaks. Operation 620 may be performed by a component such as the fingerprint extraction component 124 of FIG. 1.

At operation 630, entries indicating the fingerprints (e.g. entry 222) are added to a fingerprint table (e.g. fingerprint table 140). In some embodiments, the fingerprint table may be a hash table where fingerprint entries are assigned to hash buckets according to hash values of the fingerprints. In other embodiments, the fingerprint table may be a partitioned or sharded table, where entries are assigned based on their partition or shard key value. The fingerprint table will store entries of many previously fingerprinted audio tracks. These stored fingerprint entries will be used by the fingerprint matching system (e.g. matching system 170) to match query tracks with known audio tracks fingerprinted by the fingerprint database system. Operations 610, 620, and 630 may be performed repeatedly to fingerprint a large corpus of audio tracks.

At operation 640, the fingerprint database system tracks bucket metadata of individual buckets (e.g. buckets 220) of the fingerprint table. The bucket metadata (e.g. metadata 150) will include count-based metrics (e.g. metrics 152) of the buckets. In some embodiments, the count-based metric may be a raw count of entries contained in each bucket, and may be updated as new entries are added to each bucket. In some embodiments, the count-based metric may be a metric derived from the raw count, such as a count rank of each bucket, which may be updated periodically or in response to certain events (e.g. after the loading of a large group of tracks).

At operation 650, the fingerprint database system determines whether the count-based metric of a bucket has reached a first threshold (e.g. count threshold 162). If not, the process simply loops back to add more tracks and/or entries to the fingerprint table. If the count-based metric of the bucket has reached the threshold, the process proceeds to operation 660.

At operation 660, the fingerprint database system performs a first optimization operation (e.g. operation 165) on the bucket to begin overwriting existing entries in the bucket with new entries. This optimization effectively limits the depth of the bucket to the threshold, so that the size of the bucket is bounded. Additionally, because the overflown bucket likely contains records of high-occurrence fingerprints that are not useful for track matching, overwriting some entries in the bucket will not cause significant negative impacts on the accuracy of the matching process.

At operation 670, the fingerprint database system determines whether the count-based metric of a bucket has reached a second threshold (e.g. count threshold 162). If not, the process simply loops back to add more tracks and/or entries to the fingerprint table. If the count-based metric of the bucket has reached the threshold, the process proceeds to operation 680.

At operation 680, the fingerprint database system performs a second optimization operation (e.g. operation 167) on the bucket to add the bucket to a drop list. Buckets in the drop list are not used by the fingerprint matching system for track matching. In some embodiments, the second optimization operation may be performed as an added step after the first optimization operation. For example, the triggering threshold for the second optimization operation may be set at twice the triggering threshold for the first optimization operation. In other embodiments, the fingerprint database system may only implement one type of bucket optimization. As shown, the entire process will repeat to fingerprint additional tracks and store fingerprint records, optimizing individual buckets of the fingerprint table as needed.

Figure 7:
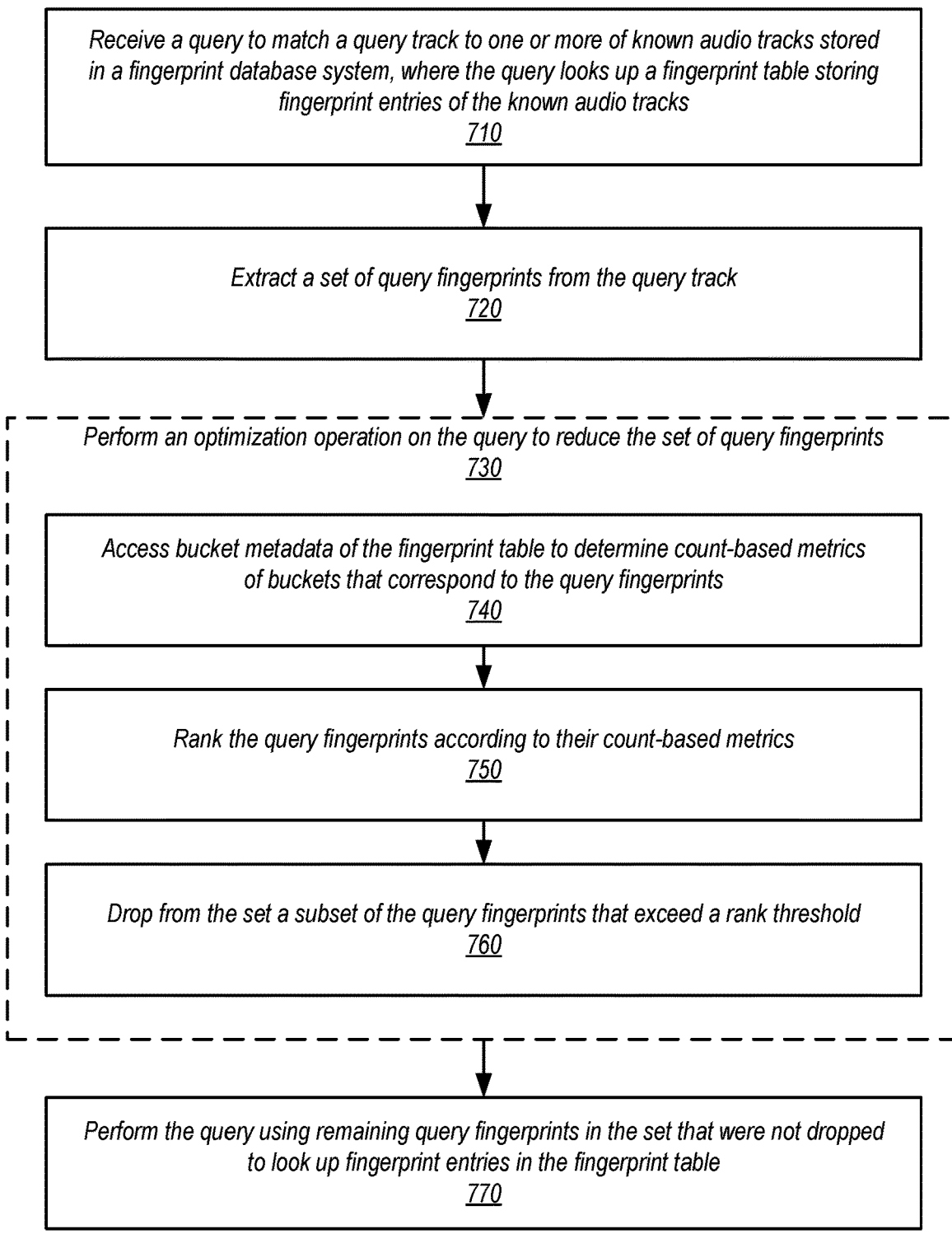
FIG. 7 is a flowchart illustrating a process of performing a fingerprint-based query in the audio track management system, according to some embodiments.

FIG. 7 is a flowchart illustrating a process of performing a fingerprint-based query in the audio track management system, according to some embodiments.

At operation 710, a query (e.g. query request 174) is received to match query track to one or more known audio tracks stored in the fingerprint database system. As discussed, the fingerprint matching system (e.g. matching system 170) may provide a query interface 172 to receive such query requests. Executing the query will involve performing lookups in the fingerprint table 140 that stores fingerprints entries of the known tracks, and comparing the store fingerprint entries with the fingerprints of the query track.

At operation 720, a set of query fingerprints (e.g. query set 180) are extracted from the query track. Operation 720 may be performed by a component such as the fingerprint extraction component 124 of FIG. 1.

As shown, operations 740 to 760 are performed as part of a query optimization operation 730 on the query (e.g. operation 193), to reduce the number of fingerprints in the query set. This optimization will reduce the amount of fingerprint table lookups that will be performed for the query, thereby reducing system resource usages and shortening query execution time.

At operation 740, the query matching system accesses the bucket metadata of the fingerprint table to determine count-based metrics of the buckets that correspond to the key values. In some embodiments, the count-based metrics may be raw entries counts for each of the buckets. In some embodiments, the fingerprint table may be a hash table, and the count-based metrics may be indexed in the bucket metadata according to the hash values of hash buckets in the hash table.

At operation 750, the query fingerprints are ranked, according to the count-based metrics of their corresponding buckets. For example, the query fingerprints may be ranked in an ascending order based on their bucket's entry counts. In some embodiments, this ranking may be performed by the database system that is used to store the bucket metadata, for example, in response to a database query that instructs the return data to be sorted.

At operation 760, the query matching system drops a subset of the query fingerprints that exceed a rank threshold. For example, the rank threshold may specify to drop 50% of the fingerprints in the query set that has the highest associated bucket sizes. The dropped fingerprints are mapped to the largest buckets in the query set that do not provide discriminative utility for the matching process, so that excluding these fingerprints will not cause a significant reduction in match accuracy. Depending on the embodiment, the rank threshold may be a static value, a dynamic value that is dynamically selected by the system at query time, and/or selected based on query parameter(s) specified in the query itself.

At operation 770, the query is performed using the remaining fingerprints of the query set that were not dropped by the query optimization operation. The remaining fingerprints are used to look up stored entries in the fingerprint table 140, which are compared to the query fingerprints of the query track. The results 198 of the query may be output via the query interface 172.

Figure 8:
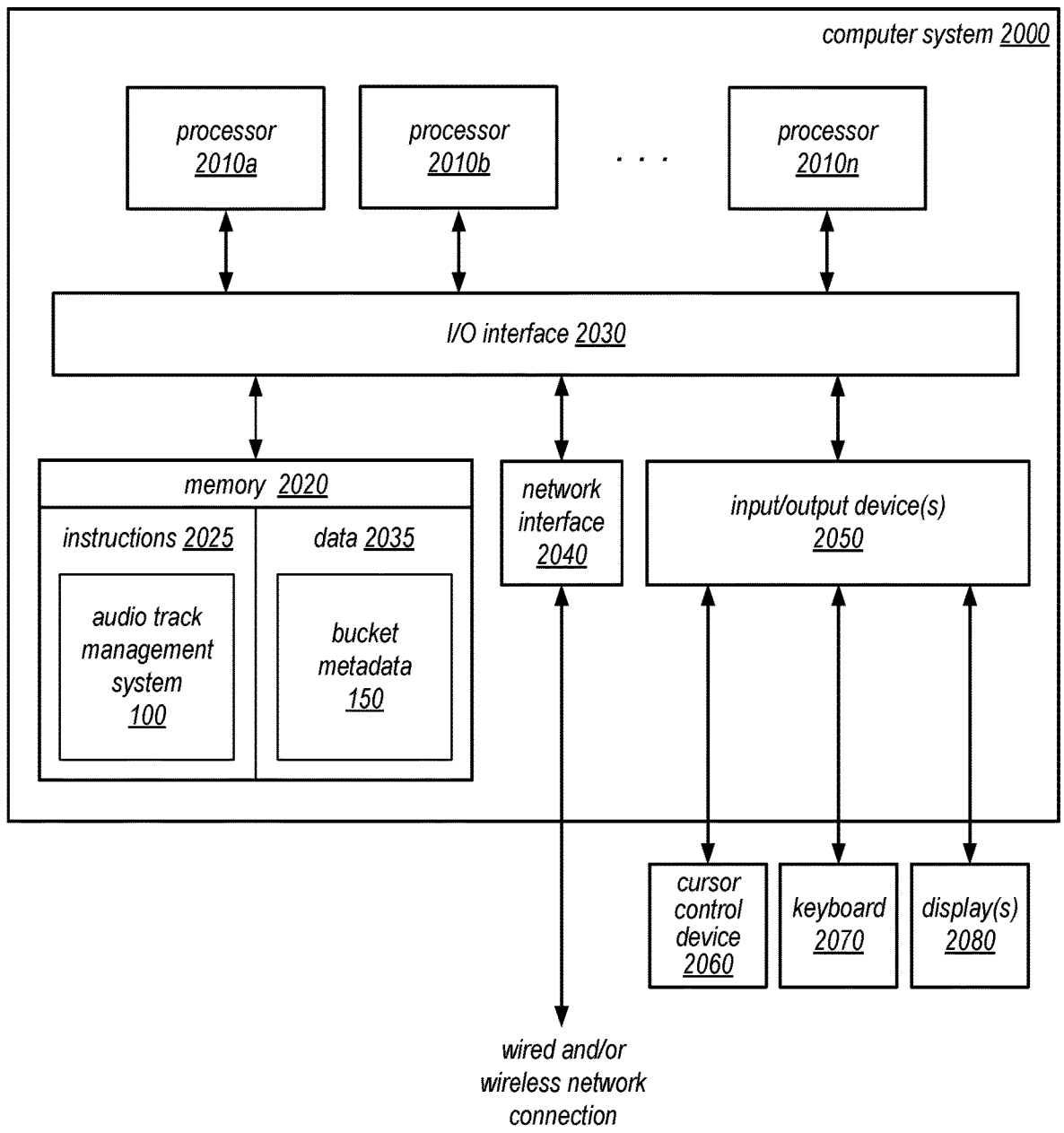
FIG. 8 illustrates an example computer system that can be used to implement portions of the audio track management system described herein, according to some embodiments.

FIG. 8 illustrates an example computer system that can be used to implement portions of the audio track management system described herein, according to some embodiments.

In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the figures. For example, the program instructions 2025 may be used to implement the functions of audio track management system 100. Data storage 2035 may include data that may be used in embodiments. For example, the data store 2035 may be used to store the bucket metadata 150. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description on a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention encompasses all such modifications and changes and, accordingly, the above description to be regarded in an illustrative rather than a restrictive sense.

What is claimed is:

1. A system, comprising:
one or more computing devices that implement a fingerprint database system, configured to:
extract, from an audio track, a plurality of fingerprints that reflect audio signal characteristics at different points in the audio track;
add entries indicating the fingerprints to respective buckets of a fingerprint table, wherein the fingerprint table contains entries indicating fingerprints of a plurality of known audio tracks, and the fingerprint table is used by a fingerprint matching system to match query tracks to the known audio tracks;
track bucket metadata of individual buckets of the fingerprint table, wherein the bucket metadata includes a count-based metric of the individual buckets of the fingerprint table;
determine that the count-based metric of a bucket in the bucket metadata exceeds a threshold, and in response:
perform an optimization operation on the bucket to drop at least some bucket data of the bucket so that the bucket data that is dropped is not used by the fingerprint match system to perform track matching,
wherein the threshold is selected based least in part on (a) a storage limit of the fingerprint table and (b) a match accuracy requirement of the fingerprint matching system.

2. The system of claim 1, wherein the optimization operation causes the fingerprint database system to overwrite existing entries in the bucket with new entries.

3. The system of claim 1, wherein the optimization operation causes the fingerprint database system to add the bucket to a drop list of buckets that are not used by the fingerprint matching system for track matching.

4. The system of claim 1, wherein the system comprises the fingerprint matching system, configured to:
receive a query to match a query track to one or more of the known audio tracks;
extract a set of query fingerprints from the query track;
perform a second optimization operation to drop one or more query fingerprints from the set of query fingerprints based at least in part on the count-based metrics in the bucket metadata; and
perform the query using remaining query fingerprints in the set that were not dropped, including to look up entries in the fingerprint table using the remaining query fingerprints of the query track.

5. The system of claim 4, wherein to drop the one or more query fingerprints from the set, the fingerprint matching system is configured to:
determine hash values for respective ones of the query fingerprints in the set;
access the bucket metadata to determine entry counts of buckets that correspond to the hash values of the query fingerprints in the set;
rank the hash values according to the entry counts; and
determine that the one or more hash values exceed a rank threshold.

6. A method, comprising:
performing, a fingerprint database system implemented by one or more computing devices:
extracting, from an audio track, a plurality of fingerprints that reflect audio signal characteristics at different points in the audio track;
adding entries indicating the fingerprints to respective buckets of a fingerprint table, wherein the fingerprint table contains entries indicating fingerprints of a plurality of known audio tracks, and the fingerprint table is used by a fingerprint matching system to match query tracks to the known audio tracks;
tracking bucket metadata of the individual buckets of the fingerprint table, wherein the bucket metadata includes a count-based metric of the individual buckets of the fingerprint table;
determining that the count-based metric of a bucket in the bucket metadata exceeds a threshold, and in response:
performing an optimization operation on the bucket to drop at least some bucket data of the bucket so that the bucket data that is dropped is not used by the fingerprint match system to perform track matching;

wherein the threshold is selected based at least in part on a storage limit of the fingerprint table.

7. The method of claim 6, wherein the optimization operation causes the fingerprint database system to overwrite existing entries in the bucket with new entries.

8. The method of claim 7, wherein the bucket is implemented as a circular array to overwrite the existing entries.

9. The method of claim 7, wherein the existing entries in the bucket are overwritten in a random manner.

10. The method of claim 6, wherein the optimization operation includes adding the bucket to a drop list of buckets that are not used by the fingerprint matching system for track matching.

11. The method of claim 10, wherein the buckets on the drop list are moved to a different storage system distinct from a storage system used to store the fingerprint table.

12. The method of claim 6, wherein tracking the bucket metadata includes incrementing entry counts of the buckets substantially in real time as new audio tracks are added to the fingerprint database system.

13. The method of claim 6, wherein the count-based metric of the bucket includes one or more of:
   a count rank of the bucket, and
   a ratio of an entry count of the bucket to a total entry count of the fingerprint table.

14. The method of claim 6, further comprising performing, by the fingerprint matching system:
   receiving a query to match a query track to one or more of the known audio tracks;
   extracting a set of query fingerprints from the query track;
   performing a second optimization operation to drop one or more query fingerprints from the set of query fingerprints based at least in part on the count-based metrics in the bucket metadata; and
   performing the query using remaining query fingerprints in the set that were not dropped, including looking up entries in the fingerprint table using the remaining query fingerprints of the query track.

15. The method of claim 14, wherein dropping the one or more query fingerprints from the set includes:
   accessing the bucket metadata to determine entry counts of buckets that correspond to the query fingerprints in the set; and
   ranking the query fingerprints according to the entry counts; and
   determining that the one or more of the query fingerprints exceed a rank threshold.

16. The method of claim 15, wherein the rank threshold is calculated based at least in part on the bucket metadata.

17. The method of claim 15, wherein the rank threshold is determined based at least in part on a query parameter of the query.

18. The method of claim 6, further comprising performing automated copyright infringement detection, original content verification, or content recognition using results generated by the fingerprint matching system.

19. One or more non-transitory computer-readable storage media storing program instructions that when executed on or across one or more processors implement a fingerprint database system and cause the fingerprint database system to:
   extract, from an audio track, a plurality of fingerprints that reflect audio signal characteristics at different points in the audio track;
   add entries indicating the fingerprints to respective buckets of a fingerprint table, wherein the fingerprint table contains entries indicating fingerprints of a plurality of known audio tracks, and the fingerprint table is used by a fingerprint matching system to match query tracks to the known audio tracks;
   track bucket metadata of individual buckets of the fingerprint table, wherein the bucket metadata includes a count-based metric of the individual buckets of the fingerprint table;
   determine that the count-based metric of a bucket in the bucket metadata exceeds a threshold, and in response:
      perform an optimization operation on the bucket to drop at least some bucket data of the bucket so that the bucket data that is dropped is not used by the fingerprint match system to perform track matching;
   wherein the threshold is selected based at least in part on a storage limit of the fingerprint table.

20. The one or more non-transitory computer-readable storage media of claim 19, wherein the program instructions when executed on or across the one or more processors implement a fingerprint matching system and cause the fingerprint matching system to:
   receive a query to match a query track to one or more of the known audio tracks;
   extract a set of query fingerprints from the query track;
   perform a second optimization operation to drop one or more query fingerprints from the set of query fingerprints based at least in part on the count-based metrics in the bucket metadata; and
   perform the query using remaining query fingerprints in the set that were not dropped, including to look up entries in the fingerprints table using the remaining query fingerprints of the query track.

* * * * *